(12) United States Patent
Hay

(10) Patent No.: US 12,102,039 B1
(45) Date of Patent: Oct. 1, 2024

(54) VARIABLE OFFSET HITCH AND RELATED WORK MACHINES

(71) Applicant: Alamo Group Inc., Seguin, TX (US)

(72) Inventor: Justin Anthony Hay, Gibson City, IL (US)

(73) Assignee: Alamo Group Inc., Seguin, TX (US)

( * ) Notice: Subject to any disclaimer, the term of this patent is extended or adjusted under 35 U.S.C. 154(b) by 969 days.

(21) Appl. No.: 17/107,418

(22) Filed: Nov. 30, 2020

(51) Int. Cl.
*A01D 67/00* (2006.01)
*A01D 34/64* (2006.01)
*B60D 1/44* (2006.01)
*B60D 1/46* (2006.01)

(52) U.S. Cl.
CPC ........... *A01D 67/005* (2013.01); *A01D 34/64* (2013.01); *B60D 1/44* (2013.01); *B60D 1/46* (2013.01)

(58) Field of Classification Search
CPC ........... A01D 67/005; B60D 1/44; B60D 1/46
See application file for complete search history.

(56) References Cited

U.S. PATENT DOCUMENTS

| | | | |
|---|---|---|---|
| 4,196,917 A * | 4/1980 | Oakes | A01D 67/005 172/324 |
| 4,403,670 A | 9/1983 | Sammarco | |
| 5,158,500 A * | 10/1992 | McLean | B60K 17/28 180/53.1 |
| 5,375,398 A | 12/1994 | McClymonds | |
| 5,531,283 A * | 7/1996 | Austin | A01B 71/066 180/53.3 |
| 5,536,032 A | 7/1996 | Golson, Jr. et al. | |
| 5,642,607 A * | 7/1997 | Stephenson | A01B 73/005 56/192 |
| 5,957,475 A | 9/1999 | Pearen et al. | |
| 6,138,445 A | 10/2000 | Toth | |
| 6,203,049 B1 * | 3/2001 | Gibson | B60D 1/155 280/494 |
| 6,412,570 B1 | 7/2002 | Pruitt et al. | |
| 6,430,908 B1 | 8/2002 | Friesen | |
| 6,739,612 B2 | 5/2004 | Colistro | |
| 6,776,432 B2 | 8/2004 | Harkcom et al. | |
| 6,854,250 B2 | 2/2005 | Boyko | |
| 6,877,758 B2 | 4/2005 | Colistro | |
| 7,024,844 B2 * | 4/2006 | Schlesser | A01B 73/067 56/14.9 |
| 7,775,024 B2 | 8/2010 | Boyko | |
| 8,256,198 B2 * | 9/2012 | Thompson | A01D 34/661 180/53.3 |
| 9,504,202 B2 | 11/2016 | Neudorf et al. | |

(Continued)

FOREIGN PATENT DOCUMENTS

| | | |
|---|---|---|
| CA | 2417428 A1 | 8/2004 |
| CA | 2776759 A1 | 11/2013 |

*Primary Examiner* — Tony H Winner
*Assistant Examiner* — Hosam Shabara
(74) *Attorney, Agent, or Firm* — Pizarro Allen PC

(57) ABSTRACT

A hitch may be configured to laterally offset the longitudinal axis of a towed implement with respect to the longitudinal axis of a towing vehicle so as to shift the towed implement to either of a left side or a right side of the towing vehicle. The hitch may provide added reach to either of a left side or a right side of a towing vehicle and provide a significantly reduced turning radius. In some embodiments, the advantages of including a variable offset hitch may be achieved without adding excessive length between a towing vehicle and pulled implement.

14 Claims, 13 Drawing Sheets

(56) References Cited

U.S. PATENT DOCUMENTS 9,873,300 B1    1/2018   Gramlow
2009/0188228 A1*   7/2009   Boyko .................. A01D 34/86
                                                              56/15.5

* cited by examiner

VARIABLE OFFSET HITCH AND RELATED WORK MACHINES

CROSS REFERENCE TO RELATED APPLICATIONS

None

FIELD

This application relates generally to hitches configured for laterally offsetting the longitudinal axis of a trailer implement with respect to the longitudinal axis of a towing vehicle. This application further relates to work machines and trailers including such hitches.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A wide variety of vehicle hitch and coupler assemblies may be used for connecting a trailer to a towing vehicle. For example, one type of vehicle hitch provides the capability for lateral adjustment of a hitch point of a trailer with respect to a longitudinal axis of a towing vehicle. Some designs that laterally adjust a hitch point of a trailer have generally added significant extra length to the hitch. This may be problematic for a number of reasons. For example, when a trailed implement requires a source of power, a power take off (PTO) may commonly be used to provide power to the trailed implement via a connecting driveline. To accommodate the extra length provided in using a hitch with a capability for lateral hitch adjustment, existing PTO drivelines may need to be modified, such as by adding complex drive systems or hydraulic pumps, adding cost to the machine. Additional support structures, such as wheel assemblies, may further become needed to support loads when using such hitches.

There is a need for improved hitches providing offset capabilities, including, for example, those that provide offset capability without adding significant extra length to the hitch. There is further a need for improved work machines that may simplify the operational controls for using a hitch and that may flexibly allow an operator to easily transition between a center aligned and an offset condition with or without using a towing vehicle's power system.

SUMMARY

In some embodiments, a variable offset hitch may be configured for connecting a trailer implement to a towing vehicle. The hitch may include a swing arm comprising a first hinge component, the first hinge component being configured for coupling with another hinge component on the towing vehicle to form a first hinge connection having a substantially vertical first axis. The hitch may further include a frame connected to the swing arm at a second hinge connection having a substantially vertical second axis spaced apart from the first axis; the frame being configured for attachment to the trailer implement. The hitch may further include at least one actuator connected to the swing arm and the frame, the at least one actuator being extendable and retractable to cause the swing arm to pivot with respect to the frame about the second axis.

In some embodiments, a variable offset hitch may be configured for connecting a trailer implement to a towing vehicle. The hitch may include: a swing arm including a first hinge component; the first hinge component configured for coupling with another hinge component on the towing vehicle to form a first hinge connection having a substantially vertical first axis; and a frame connected to the swing arm at a second hinge connection having a substantially vertical second axis; wherein the second axis is spaced apart from the first axis and wherein the hitch does not include any hinge having a substantially vertical axis between the first axis and the second axis; the frame being configured for attachment to the trailer implement; and at least one actuator connected to the swing arm and the frame; wherein the at least one actuator is extendable and retractable to cause the swing arm to pivot with respect to the frame about the second axis.

In some embodiments, a work machine may be configured for connecting to a towing vehicle, the work machine including a trailer implement and a variable offset hitch attached to the trailer implement or configured for attachment to the trailer implement. The hitch may include a swing arm comprising a first hinge component, the first hinge component being configured for coupling with another hinge component on the towing vehicle to form a first hinge connection having a substantially vertical first axis. The hitch may further include a frame connected to the swing arm at a second hinge connection having a substantially vertical second axis spaced apart from the first axis. The frame may be attached to the trailer implement or configured for attachment to the trailer implement. The hitch may further include at least one actuator connected to the swing arm and the frame, the at least one actuator being extendable and retractable to cause the swing arm to pivot with respect to the frame about the second axis.

In some embodiments, a work machine may include a towing vehicle, a trailer implement, and a variable offset hitch configured for releasably connecting the towing vehicle to the trailer implement. The hitch may include a swing arm comprising a first hinge component, the first hinge component being configured for coupling with another hinge component on the towing vehicle to form a first hinge connection having a substantially vertical first axis. The hitch may further include a frame connected to the swing arm at a second hinge connection having a substantially vertical second axis spaced apart from the first axis. The frame may be attached to the trailer implement or configured for attachment to the trailer implement. The hitch may further include at least one actuator connected to the swing arm and the frame, the at least one actuator being extendable and retractable to cause the swing arm to pivot with respect to the frame about the second axis.

In some embodiments, a variable offset hitch may be configured for connecting a trailer implement to a towing vehicle. The hitch may include: a swing arm including a first hinge component; the first hinge component configured for coupling with another hinge component on the towing vehicle to form a first hinge connection having a substantially vertical first axis; a frame connected to the swing arm at a second hinge connection having a substantially vertical second axis spaced apart from the first axis by a distance; the distance being substantially an entire length of the hitch; wherein the hitch does not include any hinge having a substantially vertical axis between the first axis and the second axis; the frame being configured for attachment to the trailer implement; and a locking assembly configured for releasably securing the swing arm in a plurality of positions with respect to the frame. The hitch may further include an actuator connected to the frame and the swing arm; the actuator being operable for moving the swing arm among the plurality of positions with the locking assembly in a released condition.

In some embodiments, a hitch is provided including an extension arm configured for coupling to a drawbar or hitch ball of a towing vehicle so as to provide a vertical rotation axis directly at the point of coupling between the hitch and the towing vehicle.

In some embodiments, a hitch is provided which includes each of a first vertical rotation axis positioned directly at a point of coupling between the hitch and a towing vehicle and a second vertical rotation axis positioned adjacent a trailer implement. The hitch may include a swing arm configured for rotational movement about each of the first vertical rotation axis and the second vertical rotation axis. In some of those embodiments, the swing arm may be configured without any intervening vertical rotational axes between the first vertical rotation axis and the second vertical rotation axis. Therefore, when a force is applied to transition the hitch to an offset condition, the entire length of the swing arm and substantially the entire length of the hitch may swing so as to maximize the lateral offset provided for the trailer implement while minimizing changes to the overall hitch length and geometry.

It is an object of some embodiments herein to provide a hitch including a capability for laterally offsetting a hitch point of a trailer implement with respect to a towing vehicle and that may be reliably used with existing PTO drivelines used with standard hitches, avoiding complex modification and/or costly retrofitting of driveline components.

It is an object of some embodiments herein to provide a variable offset hitch for use in a work machine that may be actuated independently of a towing vehicle's power system so as to provide to a user a technically simplified method of offset adjustment. For example, a hitch may be actuated so as to adopt an offset condition using manual power provided by a user or using another source of power external to a towing vehicle.

It is an object of some embodiments herein to provide a variable offset hitch for use in a work machine that may be actuated using either of one or more controls of a towing vehicle or a source of power external from the towing vehicle so as to provide a technically simplified method of offset adjustment. Advantageously, a hitch that may be actuated in the alternative using either of a towing vehicle's power system or a manual source of power may free up power resources provided from the towing vehicle for other tasks. For example, a user may either choose to remotely activate switching to an offset condition using a tractor's hydraulic power system, or a user may independently (e.g., manually or using an external power source separate from the tractor) actuate the hitch to adopt an offset condition. Thus, a tractor's hydraulic power system may be freely used for some other task, such as providing power to an agricultural implement, for example.

DETAILED DESCRIPTION

The following terms as used herein should be understood to have the indicated meanings unless the context requires otherwise.

When an item is introduced by "a" or "an," it should be understood to mean one or more of that item.

"About" means plus or minus 5%.

"Comprises" means includes but is not limited to.

"Comprising" means including but not limited to.

"Having" means including but not limited to.

A "hinge" may be any connection that permits pivotal movement of the components connected by the hinge with respect to one another. For example, a hinge may include one or more pin connections, rod and sleeve connections, ball and socket connections, or the like.

"Right", "left", and "center" references are from a perspective of an individual facing in the direction of forward travel of a machine including a hitch as described herein.

This disclosure is directed to hitches and related apparatuses. The hitches described herein are configured to laterally offset the longitudinal axis of a trailer implement with respect to the longitudinal axis of a towing vehicle so as to shift the trailer implement to either of a left side or a right side of the towing vehicle. Accordingly, the hitches described herein may also be referred to as variable offset hitches. Related work machines including variable offset hitches, such as mowing machines, are also described. The disclosed machines may provide added reach to either of a left side or a right side of a towing vehicle and may provide a significantly reduced turning radius. In some embodiments, the advantages of including a variable offset hitch may be achieved without adding excessive length between a towing vehicle and a pulled implement. Therefore, long driveline lengths, which may exacerbate problems associated with load-related driveline stress, may be avoided. Furthermore, because compact hitches may be used, in some embodiments, wheel assemblies may be used to support a pulled implement that do not include any wheels depending forwardly from the pulled implement. Accordingly, in contrast to some other machines with offset capability, in some embodiments, complex drive systems or hydraulic pumps, motors, wheel assemblies, and related support structures may be eliminated or significantly reduced due to drastic changes in the overall length and operating geometry. Because variable offset hitches as described herein may be more similar in length to standard hitches than other offset hitches, in some embodiments, it may be easier to substitute the hitches described herein in place of standard hitches without having to replace or modify existing drivelines or other supporting structures.

Figure 1:
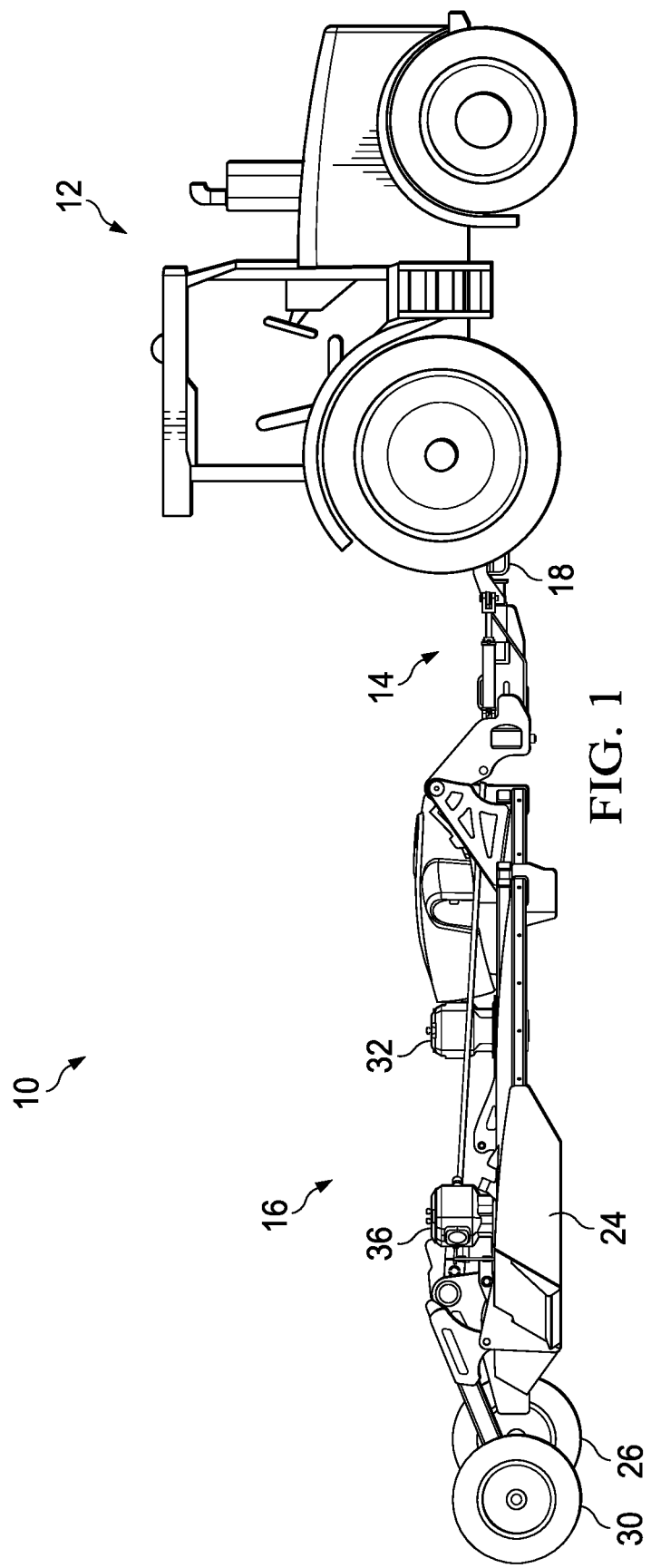
FIG. 1 is a right side elevational view of a mowing machine including a variable offset hitch, the variable offset hitch being aligned in a centered position with respect to a tractor.
Figure 2:
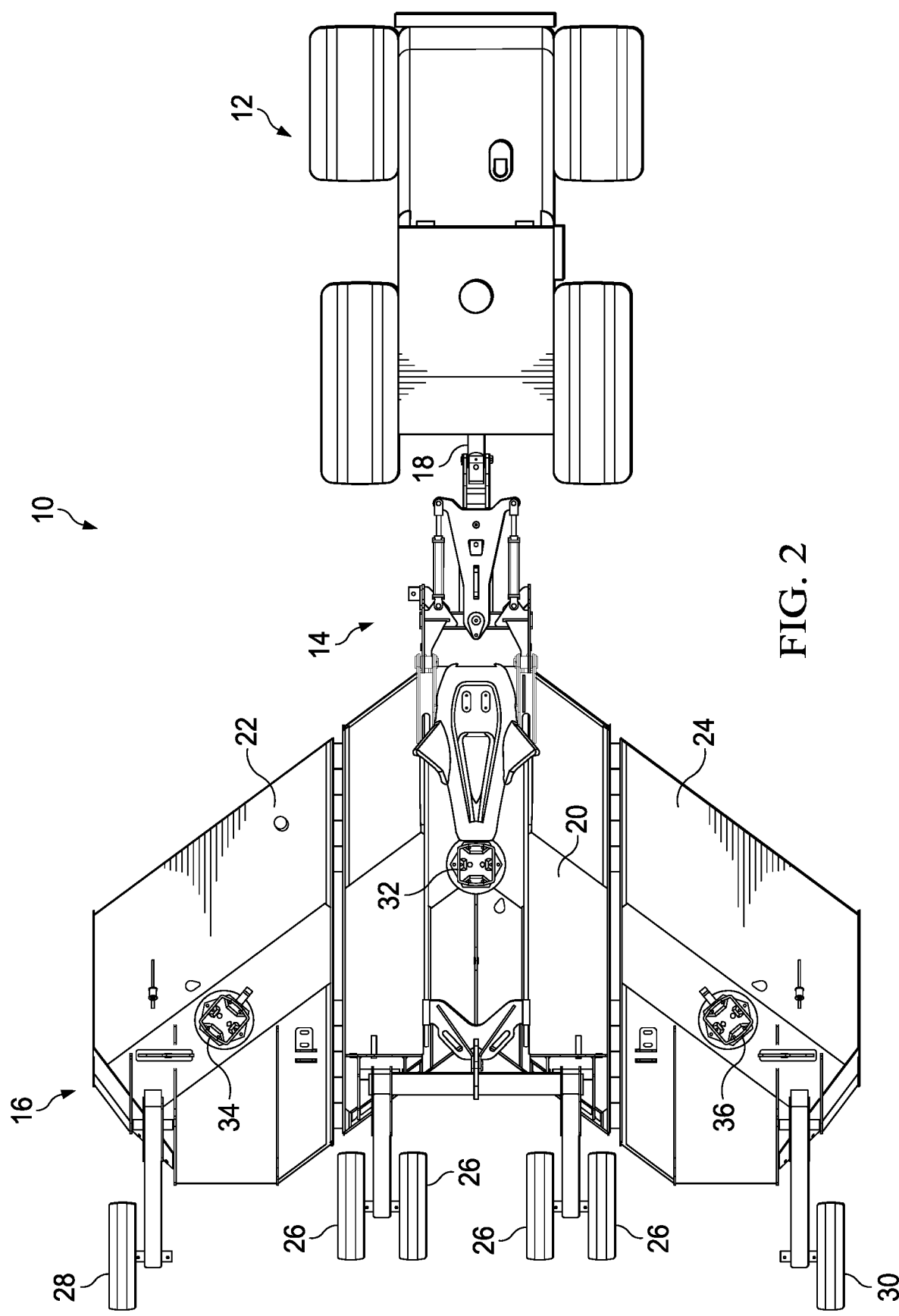
FIG. 2 is a top plan view of the mowing machine, hitch, and tractor shown in FIG. 1.
Figure 5:
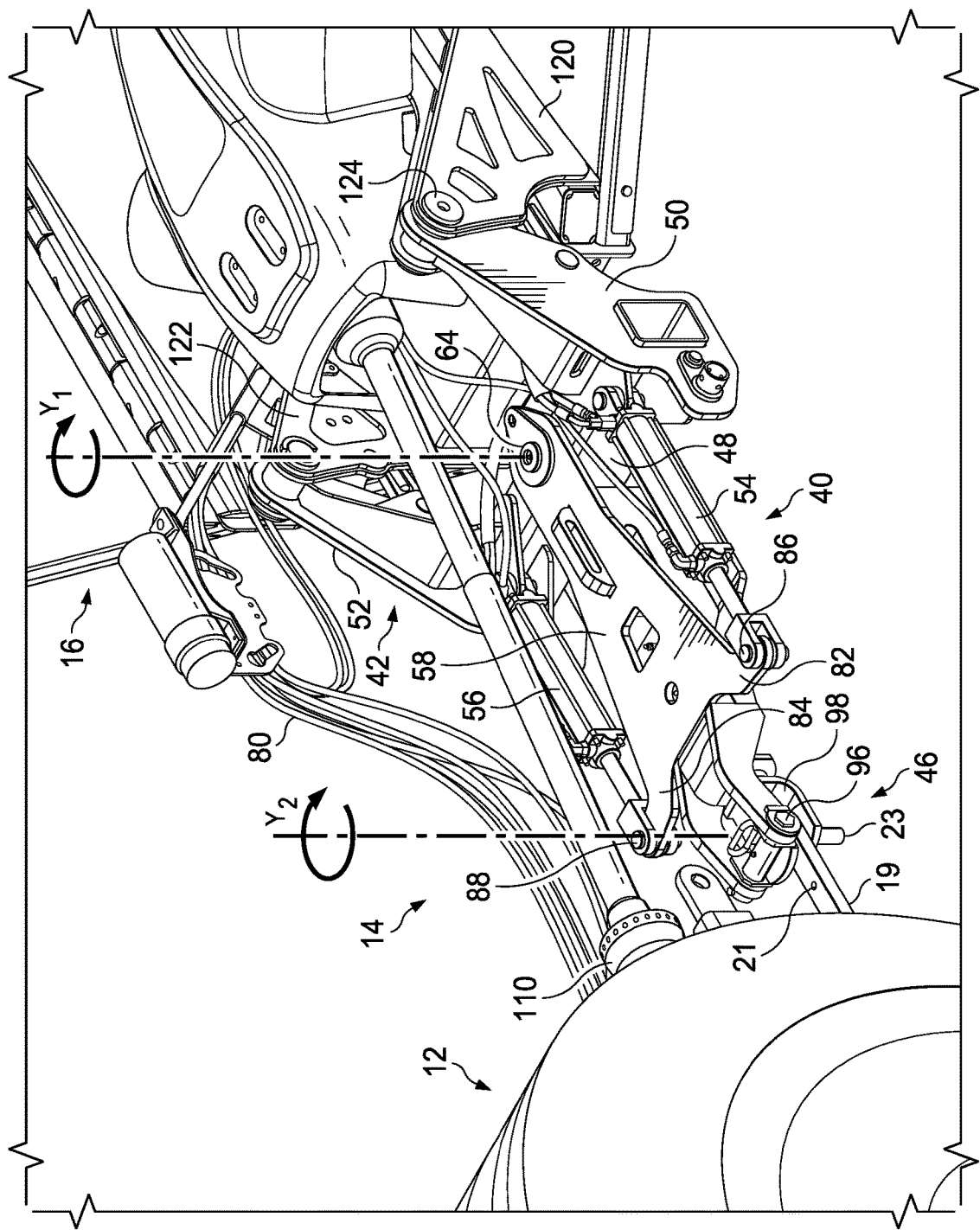
FIG. 5 is a perspective view of a variable offset hitch with the hitch connected to a back end portion of a towing vehicle and a front end portion of a cutting unit.

As shown in FIG. 1 and FIG. 2, a mowing machine 10 may include a towing vehicle 12, a hitch 14, and a cutting unit 16. The towing vehicle 12 shown in the embodiment of FIG. 1 and FIG. 2 is a tractor. However, any suitable towing vehicle may be used. Similarly, although the towed item shown in FIGS. 1 and 2 is a cutting unit, the towed item may be any suitable towed item, such as a spreader, plow, tiller, or other trailer. With further reference to FIG. 5, towing vehicle 12 may include a PTO 110 and a hitch connection 18. The PTO 110 and associated drivelines depending therefrom may pivotably connect the towing vehicle 12 and the cutting unit 16 and provide for delivery of power from the towing vehicle 12 to the cutting unit 16 throughout a range of offset conditions. In some embodiments, hitch connection 18 may be a one-point hitch connection. For example, the hitch connection 18 may comprise a shank or drawbar 19 including one or more bore holes 21 sized and shaped for receiving a hitch pin 23. In other embodiments, hitch connection 18 may comprise a vehicle hitch ball, for example.

Cutting unit 16 may be a rotary-type cutter or flail cutter or another suitable type of cutter may be used. The cutting unit 16 may include one or more blades driven by the PTO 110 of towing vehicle 12 and connected by driveshafts to gearboxes mounted on the tops of one or more cutting decks. The one or more cutting decks may be supported by wheels, including, for example, back wheels or a combination of both front wheels and back wheels. For example, as shown in FIG. 2, cutting unit 16 may include each of a central cutting deck 20, a left-side cutting deck 22, and a right-side cutting deck 24. The cutting unit 16 may be supported by back wheels 26, 28, 30 depending rearwardly from the cutting decks 20, 22, 24. The back wheels 26 may depend from the central cutting deck 20. The back wheels 28 and 30 may depend respectively from left-side cutting deck 22 and from right-side cutting deck 24. A central gearbox 32 may transfer power from the PTO 110 to each of a pair of side gearboxes 34, 36. Rotary blades or other suitable cutting elements may be included on the underside of the cutting decks 20, 22, and 24.

Figure 3:
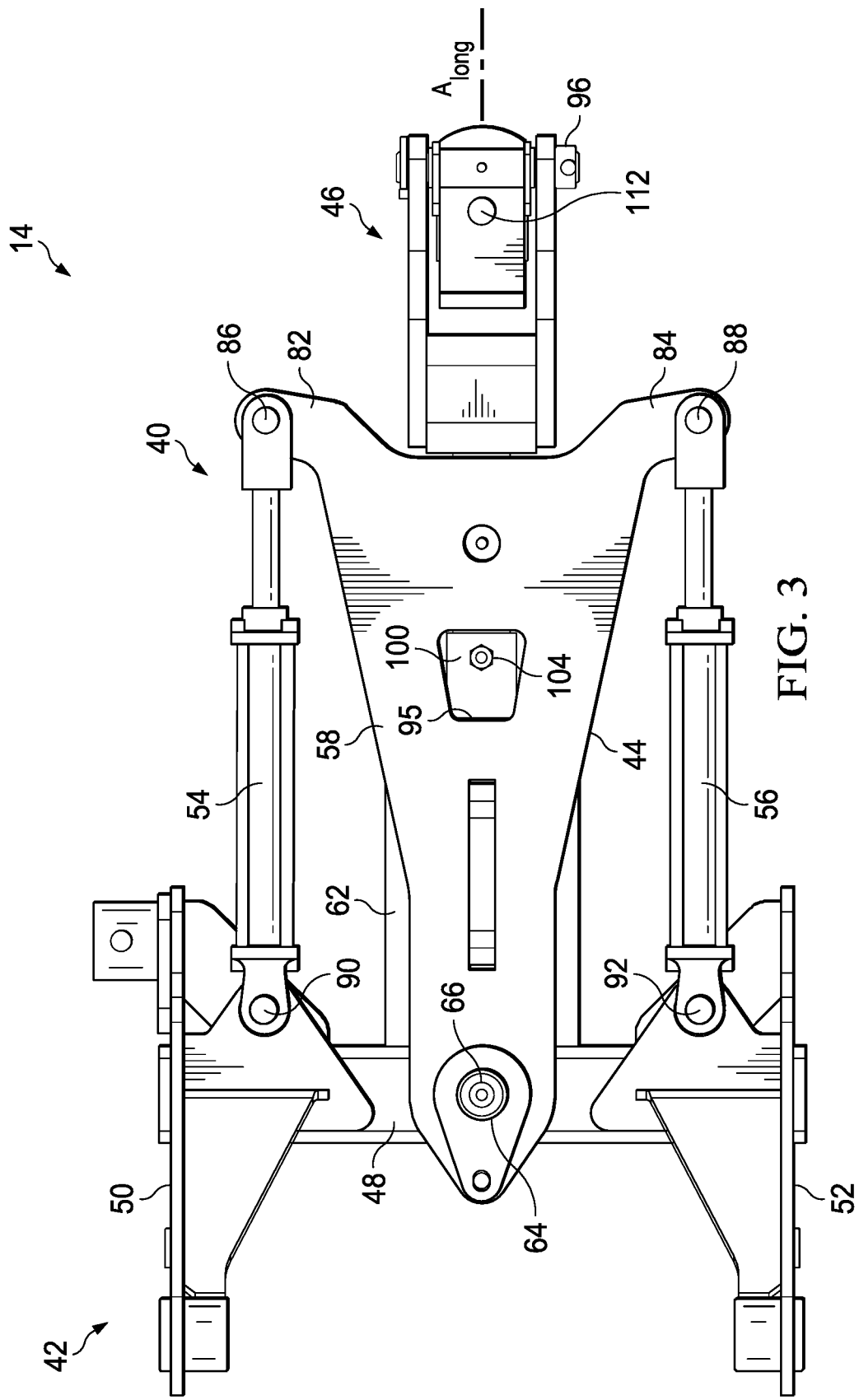
FIG. 3 is a top plan view of a variable offset hitch.
Figure 4:
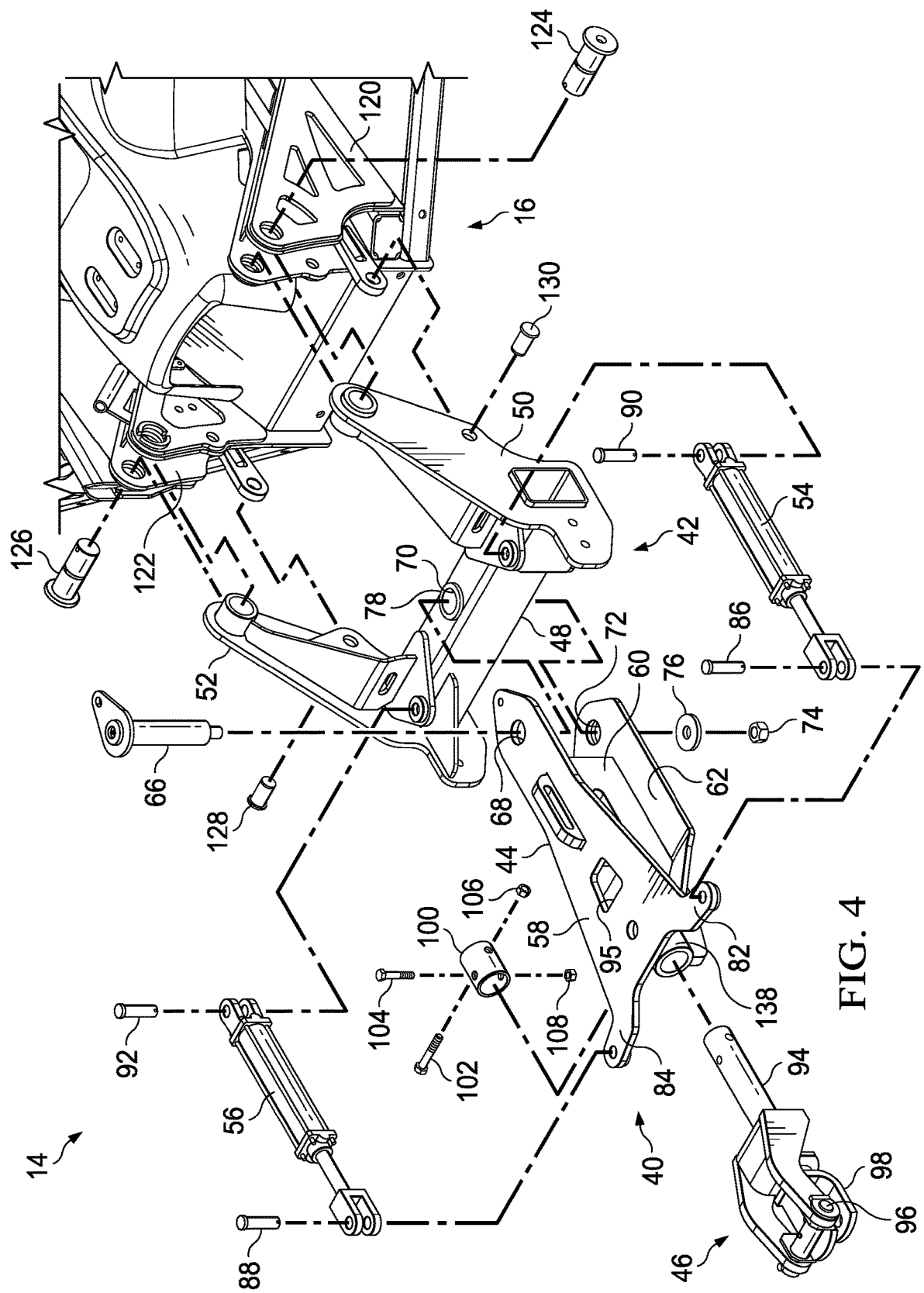
FIG. 4 is a perspective exploded view of a variable offset hitch and a front end portion of a cutting unit.

The hitch 14 is shown in further detail in FIGS. 3-5. As shown therein, hitch 14 includes a swing arm 40 and a trailer connection frame 42. The swing arm 40 includes a central support frame 44 and an extension arm 46. Although extension arm 46 is shown as a separate component attached to central support frame 44, in some embodiments extension arm 46 may be integral with central support frame 44. The connection frame 42 includes a cross bar 48 and a pair of connector arms 50, 52 attached thereto. The swing arm 40 may be attached to the connection frame 42 through the cross bar 48 at a pivot hinge 64. Pivot hinge 64 may permit either or both of swing arm 40 and cross bar 48 to rotate about a substantially vertical axis ($Y_1$) (shown in FIG. 5) when a suitable force is applied. Rotation of either one of swing arm 40 and cross bar 48 about the vertical axis $Y_1$ (or any differential rotation of those components 40, 48 about the axis $Y_1$) may adjust the relative orientation of the swing arm 40 with respect to the cross bar 48 (and thereby also adjust the orientation of swing arm 40 with respect to connection frame 42). In this way, the swing arm 40 and the cross bar 48 may pivot with respect to each other. For example, the swing arm 40 may rotate about the vertical axis $Y_1$ in one direction so as to pivot with respect to the cross bar 48 so that the cutting unit 16 adopts a right side offset condition with respect to towing vehicle 12 (shown in FIG. 13A). Likewise, the swing arm 40 may rotate about the vertical axis $Y_1$ in an opposite direction so as to pivot with respect to the cross bar 48 so that the cutting unit 16 adopts a left side offset condition with respect to towing vehicle 12 (shown in FIG. 13C).

Central support frame 44 and extension arm 46 may be connected so that the components swing together when a force is applied to initiate a transition from a center aligned condition to a left side offset condition or a right side offset condition. For example, in some embodiments, central support frame 44 may be connected to extension arm 46 using one or more pins or connected using a weldment so as to provide a rigid connection therebetween. Thus, the entire swing arm 40 may move together when the hitch 14 transitions to an offset condition. In some embodiments, central support frame 44 may be connected to extension arm 46 so as to allow extension arm 46 to move about one or more substantially horizontal axes (shown in FIG. 6). For example, as shown therein, the connection between central support frame 44 and extension arm 46 may enable rotation of at least a part of the extension arm 46 about one or more horizontal axes P and R to permit adjustment of the extension arm 46 in either of pitch, roll, or both. However, substantial rotation about any vertical axes (e.g., yaw motion) that may prevent the central support frame 44 and extension arm 46 from swinging together or that may affect a magnitude of lateral offset for a trailed implement may generally be precluded. The cross bar 48 may be connected to connector arms 50, 52 so that they move together in substantially the same relative orientation when a force is applied to initiate transition to an offset condition. The connector arms 50, 52 extend rearwardly from cross bar 48 and are configured for connecting hitch 14 to cutting unit 16. For example, as shown in each of FIG. 4 and FIG. 5, connector arm 50 may be attached to a corresponding connector arm 120 of the cutting unit 16 using the pins 124, 130. Likewise, connector arm 52 may be attached to a corresponding connector arm 122 of the cutting unit 16 using the pins 126, 128.

Central support frame 44 may be rigidly constructed for strength and may comprise one or more plates and/or supporting brackets. For example, as shown in FIG. 4, central support frame 44 may include a top plate 58, a central support bracket 60, and a bottom plate 62. The swing arm 40 may be pivotably connected to cross bar 48 through central support frame 44 using pivot hinge 64, for example. Pivot hinge 64 may be formed by inserting hitch pivot pin 66 through the openings 68, 70, and 72. Hitch pivot pin 66 may be secured in place using a bottom nut 74 and a pin retaining washer 76. A rearward facing portion of central support frame 44 may rest upon the cross bar 48 through a fitting 78. For example, an underside portion of the top plate 58 of central support frame 44 may rest upon cross bar 48 through the fitting 78. Fitting 78 may be greased to encourage rotation of central support frame 44 with respect to pivot pin 66 so that swing arm 40 may rotate about pivot hinge 64 and pivot with respect to cross bar 48. Thus, the vertical axis of pivot pin 66 may correspond with the first rotation axis ($Y_1$) of pivot hinge 64.

Hitch 14 may include at least one actuator configured to supply a suitable force for activating pivotable movement of the swing arm 40 with respect to the cross bar 48 when adopting an offset condition or returning to a central aligned position. For example, in the embodiment shown in FIGS. 3-5, the hitch 14 includes a pair of actuators comprising left-side actuator 54 and right-side actuator 56. The actuators 54, 56 may be positioned on opposite sides of the hitch 14 and aligned substantially parallel with a longitudinal axis ($A_{long}$) of the hitch 14. The actuators 54, 56 may, for example, be hydraulic or pneumatic cylinders or electric actuators. The actuators 54, 56 may be connected to swing arm 40 through a pair of tabs 82, 84 which are part of or extend from top plate 58. For example, left-side actuator 54 may be connected to the left-side tab 82 at a first end using actuator connector pin 86. Likewise, right-side actuator 56 may be connected to swing arm 40 through right-side tab 84 using actuator connector pin 88. The actuators 54, 56 may further be connected to connection frame 42. For example, left-side actuator 54 may be connected to connection frame 42 through connector arm 50 at a second end using a pin 90. Likewise, right-side actuator 56 may be connected to connection frame 42 through connector arm 52 using a pin 92. Alternatively, actuators 54, 56 may be connected to connection frame 42 by securing the actuators 54, 56 to the cross bar 48. For example, a forward facing end of left-side actuator 54 may be attached to swing arm 40 at tab 82. A rearward facing end of left-side actuator 54 may be attached to a first end of cross bar 48. The actuator 54 may be attached at an end of the cross bar 48 or generally at a suitable distance away from the pivot hinge 64 to provide a sufficient lever arm for applying a sufficient level of torque to pivot the swing arm 40 when actuated upon. Likewise, a forward facing end of right-side actuator 56 may be attached to the swing arm 40 at tab 84. A rearward end of right-side actuator 56 may be attached to cross bar 48 at an opposing end of cross bar 48, such as at a suitable distance to provide a lever arm sufficient for applying a desired level of torque on the cross bar 48 to rotate cross bar 48 about pivot hinge 64.

Figure 6:
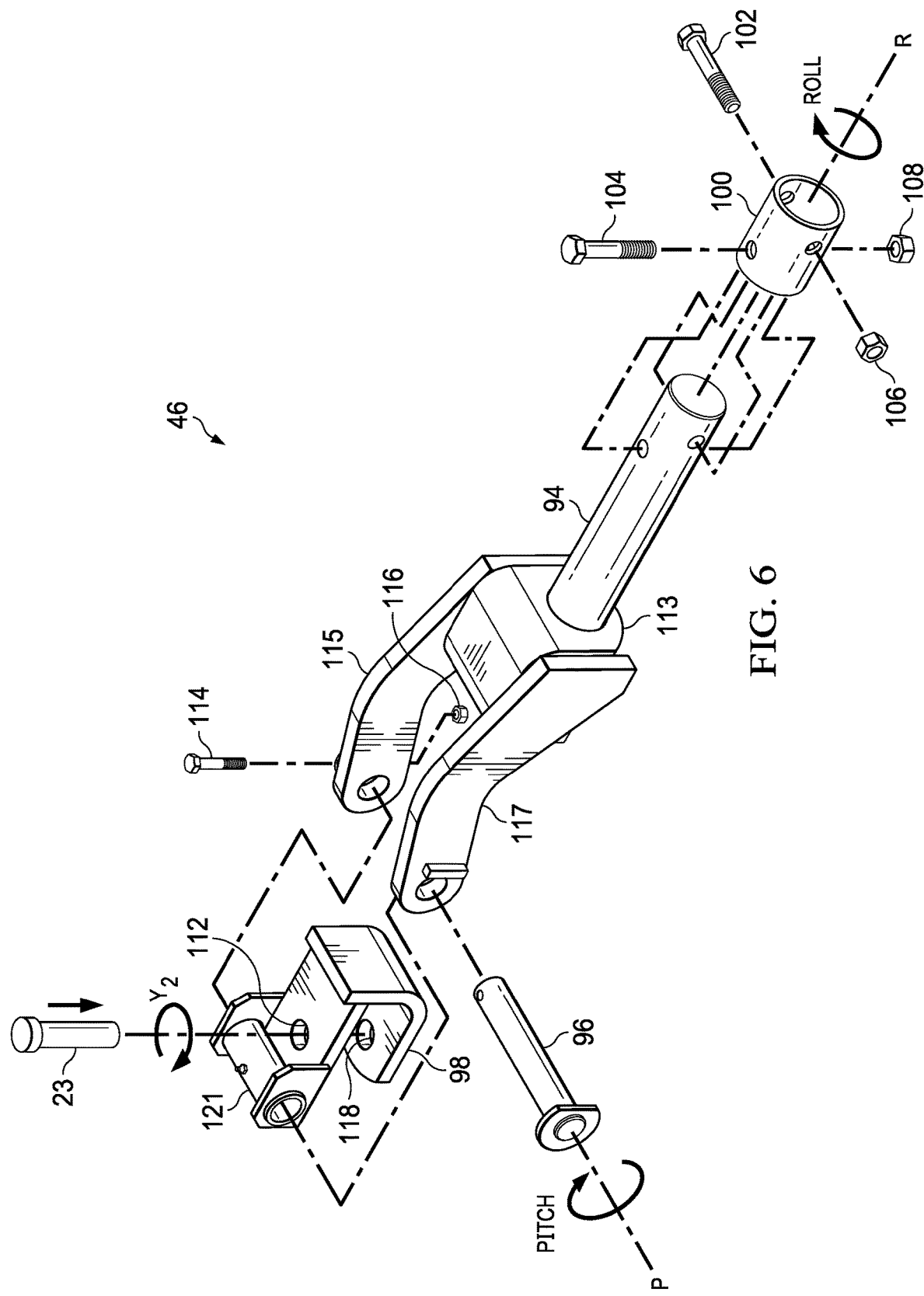
FIG. 6 is an exploded perspective view of an extension arm of a hitch and a hitch pin.

Extension arm 46 may be disposed forwardly from the top plate 58 of central support frame 44 and may be used to removably attach hitch 14 to towing vehicle 12. For example, as shown in FIG. 5 and FIG. 6, extension arm 46 may be directly secured to a towing vehicle's drawbar 19 using hitch pin 23. To attach hitch 14 to towing vehicle 12, the drawbar 19 may be positioned to engage the clevis 98 of the extension arm 46 so that the drawbar 19 is generally bracketed thereby. Hitch pin 23 may pass through an opening 112 in one lip or wing of the clevis 98, then through the drawbar 19, and finally through another opening 118 in another lip or wing of the clevis 98. The hitch pin 23 may securely connect hitch 14 to the towing vehicle 12 but permit rotation thereabout. The vertical rotation axis ($Y_2$) may generally coincide with the vertical axis of the hitch pin 23. Using hitch pin 23 and a one-point hitch connection allows for rotation directly at the point of connection between the hitch 14 and the towing vehicle 12. In other embodiments, the extension arm 46 may include a socket configured to receive a hitch ball securely and rotationally. A vertical axis of the hitch ball may generally define a vertical axis for rotation (e.g., axis $Y_2$). Persons of ordinary skill in the art will appreciate that extension arm 46 may include any suitable structure that is compatible with a mating structure of towing vehicle 12 to form a hinge connection between towing vehicle 12 and hitch 14. Each of the hinge-forming structures of towing vehicle 12 and hitch 14 may be referred to as hinge components.

The extension arm 46 may be connected to the central support frame 44 so that the components 44, 46 may move together with respect to the cross bar 48 when a suitable force is applied. In other words, the swing arm 40 may pivot as a whole with respect to the cross bar 48 about pivot hinge 64. As described previously and now more fully explained with particular reference to FIGS. 4-6, in some embodiments, the extension arm 46 may be connected to central support frame 44 so as to allow at least a portion of the extension arm 46 to move or rotate about one or more substantially horizontal axes. For example, a shaft 94 of extension arm 46 may be rotatably mounted within a securement tube 138. The shaft 94 may further be secured within securement tube 138 using a collar 100. The collar 100 may be attached to a rearward end of the shaft 94 extending from a rearward end of securement tube 138 using a pair of cap screws 102, 104, and a pair of locknuts 106, 108. An opening 95 may be provided in top plate 58 to help facilitate installation of collar 100 to shaft 94. The shaft 94 may be permitted to rotate within the securement tube 138 along the longitudinal roll axis (R) generally defined by the center of the shaft 94. The shaft 94 may further be secured to a body 113 at a forward end. The body 113 includes a pair of side wings 115, 117 extending therefrom. A pin 96 may be inserted through a pair of openings in each of the side wings 115, 117 and further through a sleeve 121 disposed on a top wing or lip of the clevis 98. The pin 96 may be secured therein using a cap screw 114 and a locking nut 116. The pin 96 and sleeve 121 may hingedly connect the clevis 98 to the body 113, thereby providing a hinge for adjustment of the pitch of the clevis 98. That is, the clevis 98 may rotate about a pitch axis (P) generally coinciding with the longitudinal axis of the pin 96. Accordingly, the extension arm 46 may be rotatable to some extent about the horizonal roll axis (R) and the clevis 98 may be rotatable to some extent about the horizontal pitch axis (P) to provide rolling and pitch adjustment of the extension arm 46 such as may be advantageous when adjusting the hitch 14 for insertion of hitch pin 23 when connecting hitch 14 to the towing vehicle 12. Moreover, in operation, the clevis 98 may generally move together with the drawbar 19 so that the clevis 98 and the drawbar 19 remain about parallel to each other. This may provide a robust one-point hitch connection wherein the clevis 98 and drawbar 19 may distribute load forces over an extended surface area thereby decreasing likelihood of damage to the clevis 98 and/or drawbar 19 and hitch pin 23.

Advantageously, the one-point hitch connections described herein may provide for reduced added length as compared to other hitch connections with offset capability, including those designed with two-point and three-point connections to a towing vehicle, which may require a separate vertical rotation axis offset from the point of connection between the towing vehicle and the hitch. That is, those other designs generally include one or more non-pivoting connector pieces which add length to the hitch but do not contribute extra lateral offset reach. In contrast, the swing arm 40 generally extends from the pivot hinge 64 to the clevis 98 (where the hitch pin 23 may be coupled). This length comprises a substantial portion of the entire length of the hitch 14. Thus, about the entire length of the hitch (e.g., the distance between axis $Y_1$ and axis $Y_2$ as shown in FIG. 5) may pivot so as to maximize offset reach while minimizing changes to the overall length and hitch geometry. In some embodiments, the length of the swing arm 40 (e.g., from axis $Y_1$ to axis $Y_2$) may be about 40 inches to about 100 inches, or about 42 inches to about 80 inches, or about 45 inches to about 60 inches. This compact design may be particularly advantageous in mowing machines and other machines where drivelines need to be designed for supplying significant draft loads because it removes or minimizes need for drive system modifications that may otherwise be needed if the overall length of the hitch was significantly changed.

Figure 7:
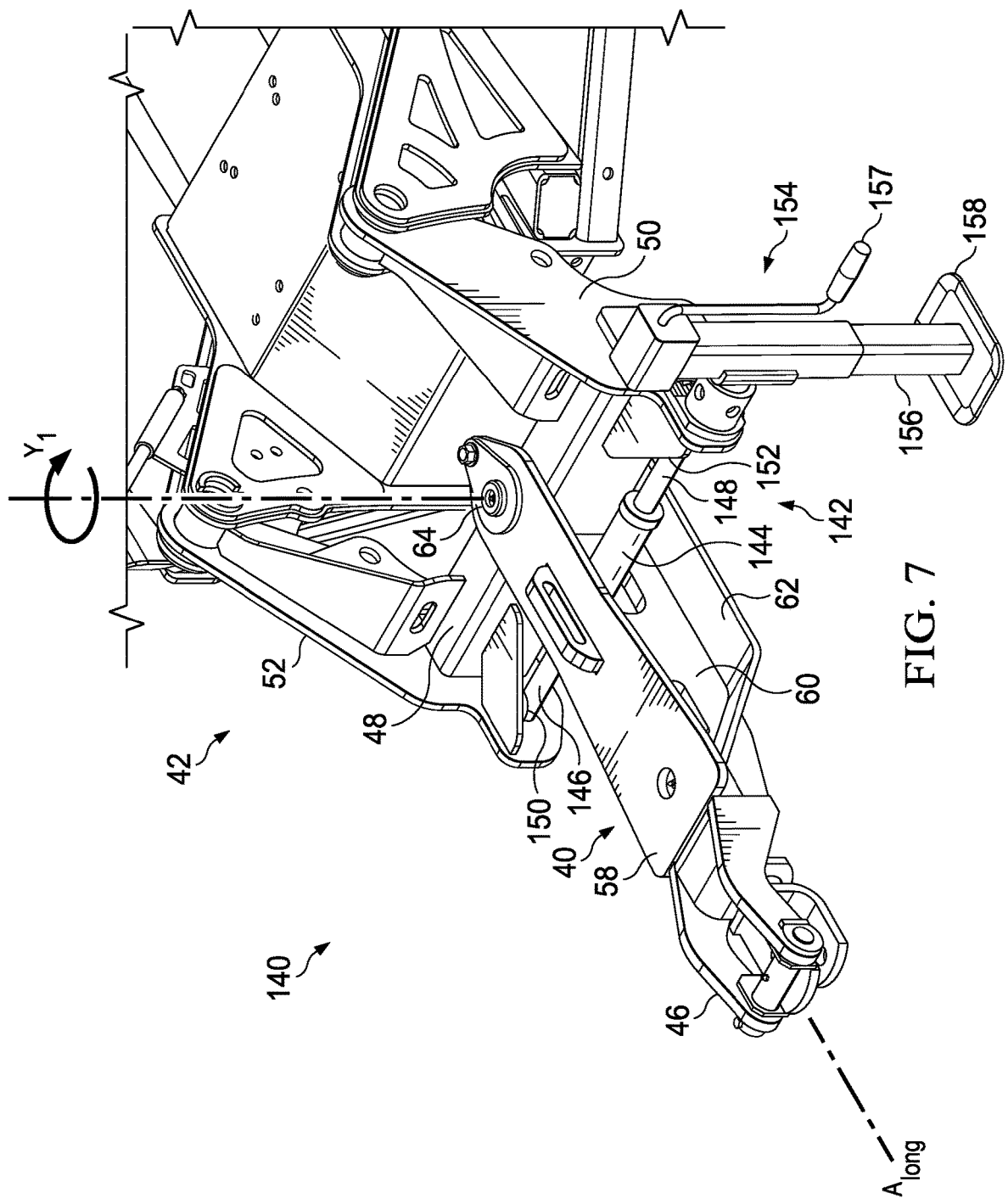
FIG. 7 is a perspective view of another embodiment of a variable offset hitch and a front end portion of a cutting unit, the variable offset hitch including an actuator disposed so that a longitudinal axis of the actuator extends in a substantially parallel orientation with the longitudinal axis of a cross bar.

FIG. 7 shows another embodiment of a hitch 140. The hitch 140 may include an actuator or steering cylinder 142 disposed so that a longitudinal axis of the steering cylinder 142 extends in a substantially parallel orientation with the longitudinal axis of the cross bar 48 (e.g., substantially transverse to axis $A_{long}$ of hitch 140). The steering cylinder 142 may be used in place of either or both of the actuators 54, 56 (see FIGS. 3-5) to apply a suitable force to rotate the swing arm 40 about the pivot hinge 64. Steering cylinder 142 may be a single rod or double rod cylinder. For example, in the embodiment shown in FIG. 7, steering cylinder 142 may be a double rod cylinder and may include a cylinder body 144, a first piston rod 146, and a second piston rod 148. The cylinder body 144 may be secured to the swing arm 40. For example, cylinder body 144 may be secured to top plate 58 using a pin. The piston rod 146 may be connected at a first end 150 to the trailer connection frame 42. Likewise, the piston rod 148 may be connected at a second end 152 to the trailer connection frame 42. Thus, the ends 150, 152 are generally attached to opposite sides of the trailer connection frame 42. Extension and/or retraction of either or both of the piston rods 146, 148 with respect to cylinder body 144 may provide a force to the connection frame 42 and a corresponding reactionary force on the cylinder body 144, thereby causing hitch 140 to pivot about pivot hinge 64. For example, in some embodiments, the piston rods 146, 148 may be attached to both sides of a common piston housed within the cylinder body 144 so that the rods 146, 148 may move together when the steering cylinder 142 is actuated. Alternatively, in the case of a single rod actuator, only a single piston rod may extend from the cylinder body 144. In the case of a single rod actuator, the actuator may supply either of a push or a pulling force to one side of the trailer connection frame 42 as appropriate to adopt a given offset condition. In either situation, upon actuation of the steering cylinder 142, the cylinder body 144 may provide a corresponding force to the swing arm 40 (which is attached thereto) so as to cause rotation of the swing arm 40 about the substantially vertical rotation axis $Y_1$ of pivot hinge 64.

As shown in FIG. 7, in some embodiments, the steering cylinder 142 may traverse through an opening of the swing arm 40. In some embodiments, the cylinder body 144 may be attached to the top plate 58 through a hinge so as to allow the cylinder body 144 to pivot about a centerline of the swing arm 40. Accordingly, the orientation between the steering cylinder 142 and swing arm 40 may adjust as the relative angle between the swing arm 40 and cross bar 48 changes due to rotation of either or both of those components 40, 48 about the pivot hinge 64. In some embodiments, either or both of the piston rods 146, 148 may likewise be connected to the trailer connection frame 42 through a hinged connection. In this way, the steering cylinder 142 may be equipped to both slide and pivot along the centerline of the swing arm 40 as the swing arm 40 rotates about the pivot hinge 64. In this manner, stress may be reduced in the steering cylinder 142 as the angle between the swing arm 40 and cross bar 48 changes.

In some embodiments, steering cylinder 142 may be a hydraulic, pneumatic, or electric cylinder operatively connected to receive power from a vehicle's power take off or from a tractor's hydraulic system or battery or other suitable power source, for example. Delivery of power to the steering cylinder 142 may be controlled by an operator operating one or more cab accessible or other controls. For example, an operator may activate one or more levers controlling a tractor's hydraulics system to deliver hydraulic power to the steering cylinder 142 and activate transition to either of an offset left or an offset right condition or return to a center position.

Figure 8:
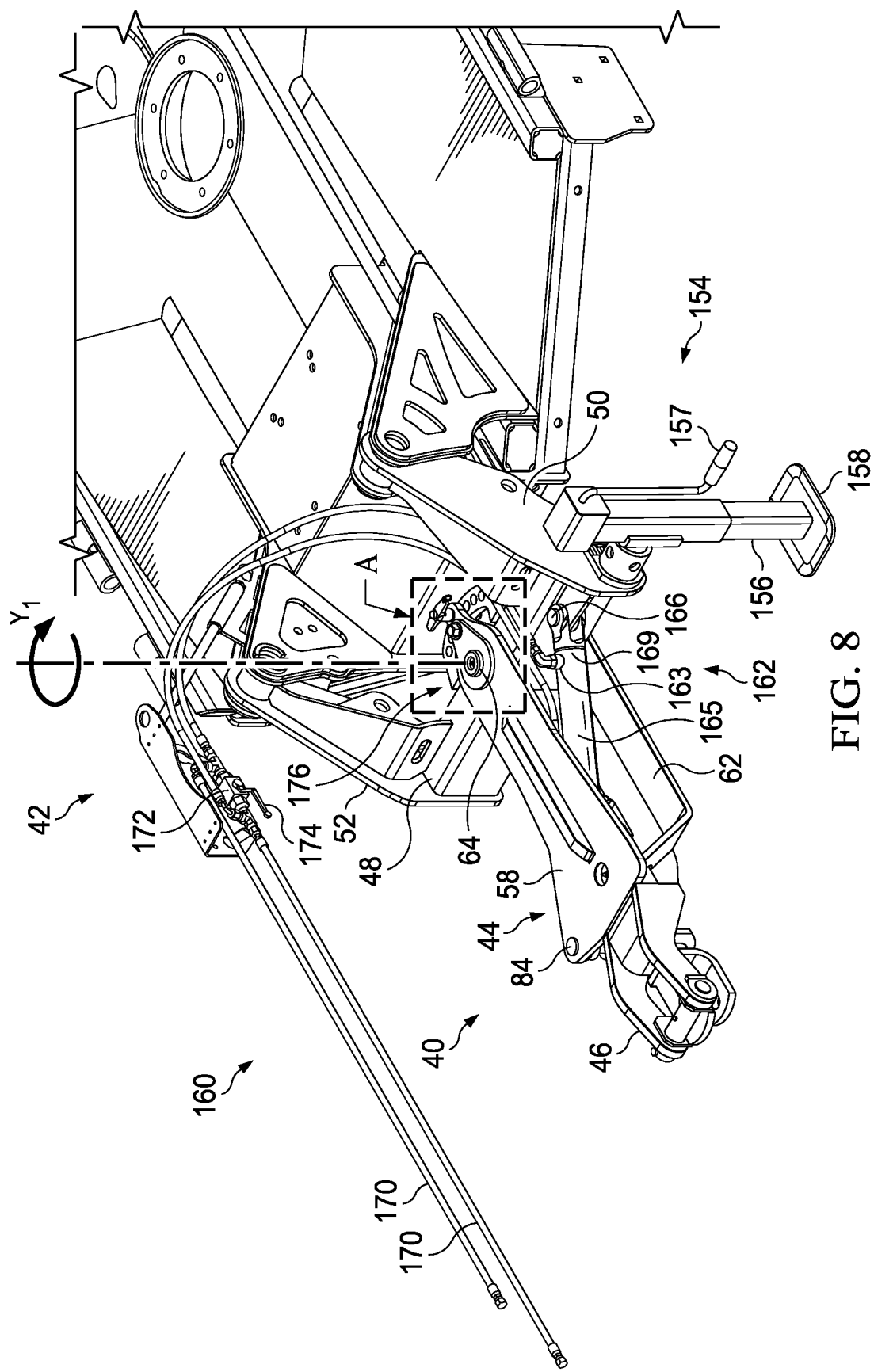
FIG. 8 is a left-side perspective view of another embodiment of a variable offset hitch and a front end portion of a cutting unit, the variable offset hitch including an actuator oriented diagonally across the body of the hitch.
Figure 9:
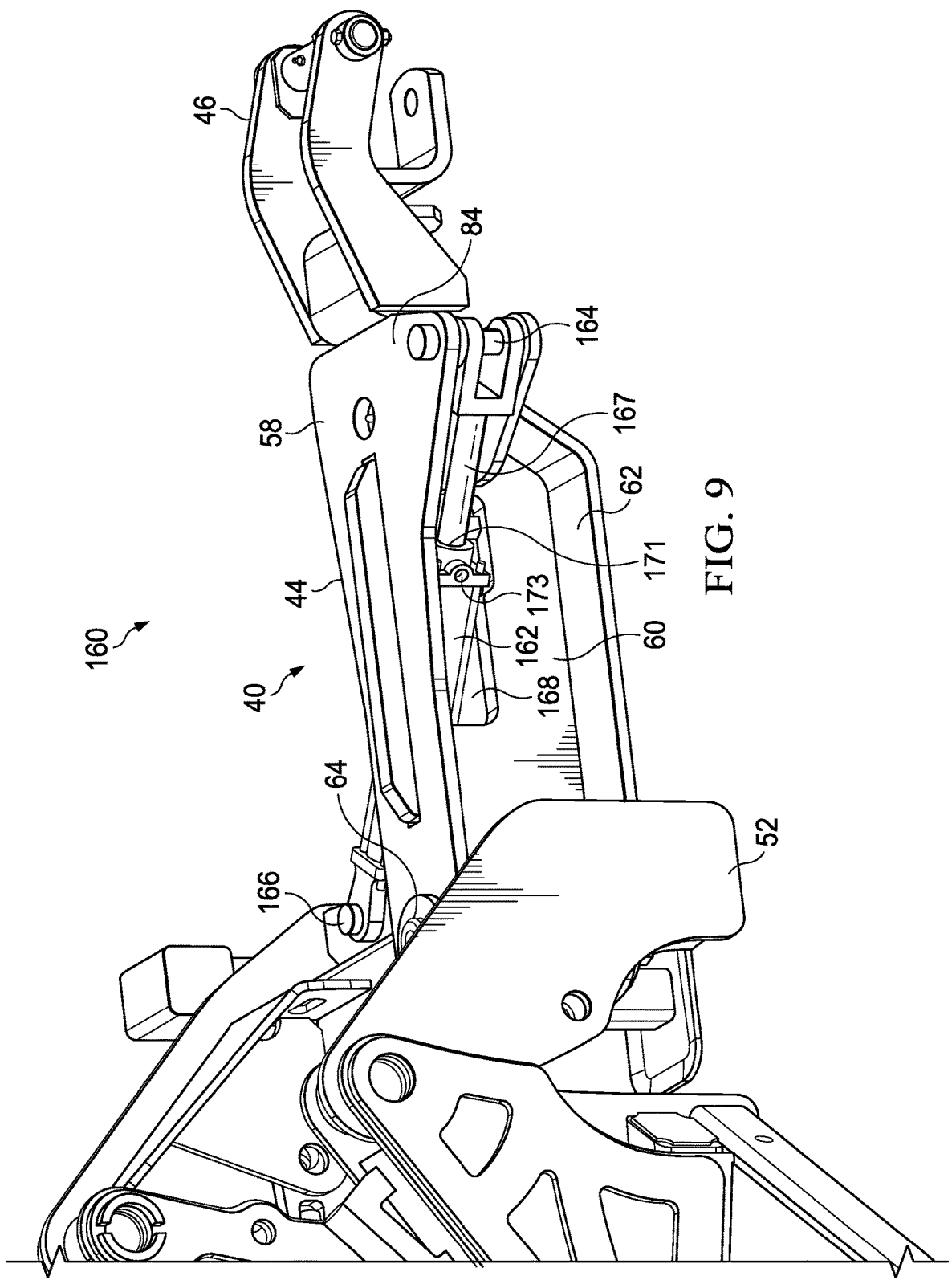
FIG. 9 is a right-side perspective view of the variable offset hitch shown in FIG. 8 with hoses removed for clarity.

FIGS. 8-11 show another embodiment of a hitch 160. The hitch 160 may include a single actuator 162 generally disposed diagonally through or across the body of the hitch 160. For example, actuator 162 may be connected rearwardly to the trailer connection frame 42 on one side of the hitch 160 and extend diagonally through or across the central support frame 44 for connection on a forward portion of the central support frame 44 on an opposite side of the hitch 160. For example, as shown in FIG. 8 and FIG. 9, actuator 162 may be connected rearwardly to a left side of the trailer connection frame 42 at one or more of cross bar 48, connector arm 50, or some other suitable structure, such as a supporting bracket or plate generally disposed on the left side of the trailer connection frame 42. The actuator 162 may extend diagonally through or across the central support frame 44 for connection to a forward portion of the central support frame 44, such as on right-side tab 84. For example, the actuator 162 may be connected to the central support frame 44 using a hinged connection pin 164. Likewise, actuator 162 may be connected to the trailer connection frame 42 using a pin 166 or other suitable structure providing a hinged connection. Thus, the actuator 162 may rotate about one or more connection points so as to relieve stress on the actuator as the swing arm 40 is moved from a center aligned to an offset condition. In the embodiment shown in FIGS. 8-11, the actuator 162 passes through an opening 168 in the central support bracket 60. Accordingly, the actuator 162 may be protected from the external environment. Likewise, nearby persons may be less likely to become injured by inadvertent contact with moving components of the hitch 160. While the actuator 162 is shown positioned along one diagonal extending across the body of the hitch, the actuator 162 may alternatively be positioned along an opposite diagonal. For example, the actuator 162 may alternatively be connected rearwardly to a right side of the trailer connection frame 42 and connected forwardly to a left-side tab of the top plate 58.

In some embodiments, the hitches 14, 140, 160 described herein may be configured so that they may be automatically adjusted so as to achieve a selected offset condition, configured so that they may be manually adjusted so as to achieve to a selected offset condition, or configured for both manual and automatic adjustment. Hitches may, for example, be configured so that an operator may easily and reversibly switch between a first state wherein the hitch may be automatically adjusted and a second state wherein the hitch may be manually adjusted. For example, in some embodiments, switching between the first state and the second state may include selectively engaging or disengaging one or more of the actuators 54, 56, 162 or the steering cylinder 142 from an associated power system, such as a hydraulic or pneumatic or electrical power system.

For example, in some embodiments, actuator 162 may be a hydraulic actuator and may include a cylinder body 165 and a piston rod 167. The cylinder body 165 may include one or more fluid ports so that the cylinder body 165 may be placed in hydraulic fluid communication with a towing vehicle's hydraulic system. For example, hydraulic actuator 162 may be operatively connected to a towing vehicle's hydraulic system using a pair of hoses 170. A first member of the pair of hoses 170 may be used to route hydraulic fluid between a towing vehicle and a base or cap end 169 of the cylinder body 165 using a cap end fluid port 163. A second member of the pair of hoses 170 may be used to route hydraulic fluid between a towing vehicle and a rod end 171 of the cylinder body 165 using a rod end fluid port 173. At least one of the pair of hoses 170 may be routed through a control valve 172. The control valve 172 may include a lever 174 or other switch configured to open or close the control valve 172 so as to selectively engage or disengage actuator 162 from the towing vehicle's hydraulic system. Thus, an operator may use the lever 174 to engage the towing vehicle's hydraulic system so as to allow fluid flow from the rod end 171 of the cylinder body 165 to the base end 171 of the cylinder body 165. In this state, hydraulic fluid may be provided so as to facilitate automatic adjustment of the hitch 160. Alternatively, an operator may use the lever 174 to disengage the actuator 162 from the towing vehicle's hydraulics system. For example, in some embodiments, hitch 160 may be configured so that it may be disengaged from the hydraulics system of a tractor. An operator may then manually adjust an offset position for the hitch 160 by applying a suitable level of force so as to manually rotate the swing arm 40 about the axis ($Y_1$) so as to pivot the swing arm 40 with respect to the cross bar 48 and associated frame 42 when the hitch 160 is not connected to the towing vehicle 12, for example. In other embodiments, actuator 162 may be controlled by another source of power, such as an electric source of power. In some of those embodiments, the power source may likewise be disconnected or otherwise placed into a configuration wherein an operator may manually adjust an offset position for the hitch 160 by applying a suitable level of force so as to manually rotate the swing arm 40.

In some embodiments, hitch 160 may further include a locking assembly 176. Locking assembly 176 may be used to secure the position of the swing arm 40 with respect to the cross bar 48 and frame 42 so as to prevent rotation of the swing arm 40 about the vertical axis ($Y_1$). Locking assembly 176 may be adjustable so that a user may disengage the locking assembly 176 so as to release the hitch 160 from a secured or locked position relative to the cross bar 48 and frame 42. Accordingly, an operator may then apply a manual level of force to manually rotate the swing arm 40 relative to the cross bar 48. The operator may then reengage the locking assembly 176 so as to secure the hitch 160 in a desired offset condition. In some embodiments, manual adjustment of the hitch 160 and rotation of the swing arm 40 may require that an operator place the actuator 162 in a state suitable for manual adjustment, such as by disconnecting the actuator 162 from a power system, for example.

Locking assembly 176 is shown together with and described in operation with some embodiments of the hitch 160. However, in some embodiments, a similar locking assembly may be included in other hitches 14, 140 described herein. For example, in some embodiments, one or more of the actuators 54, 56 or steering cylinder 142 described in relation to the hitches 14, 140 may similarly be placed into a state wherein the swing arm 40 may be rotated about the axis ($Y_1$) using a manually applied force. Locking assembly 176 may then be used to secure the hitch 14, 140 in a selected offset condition.

Figure 10:
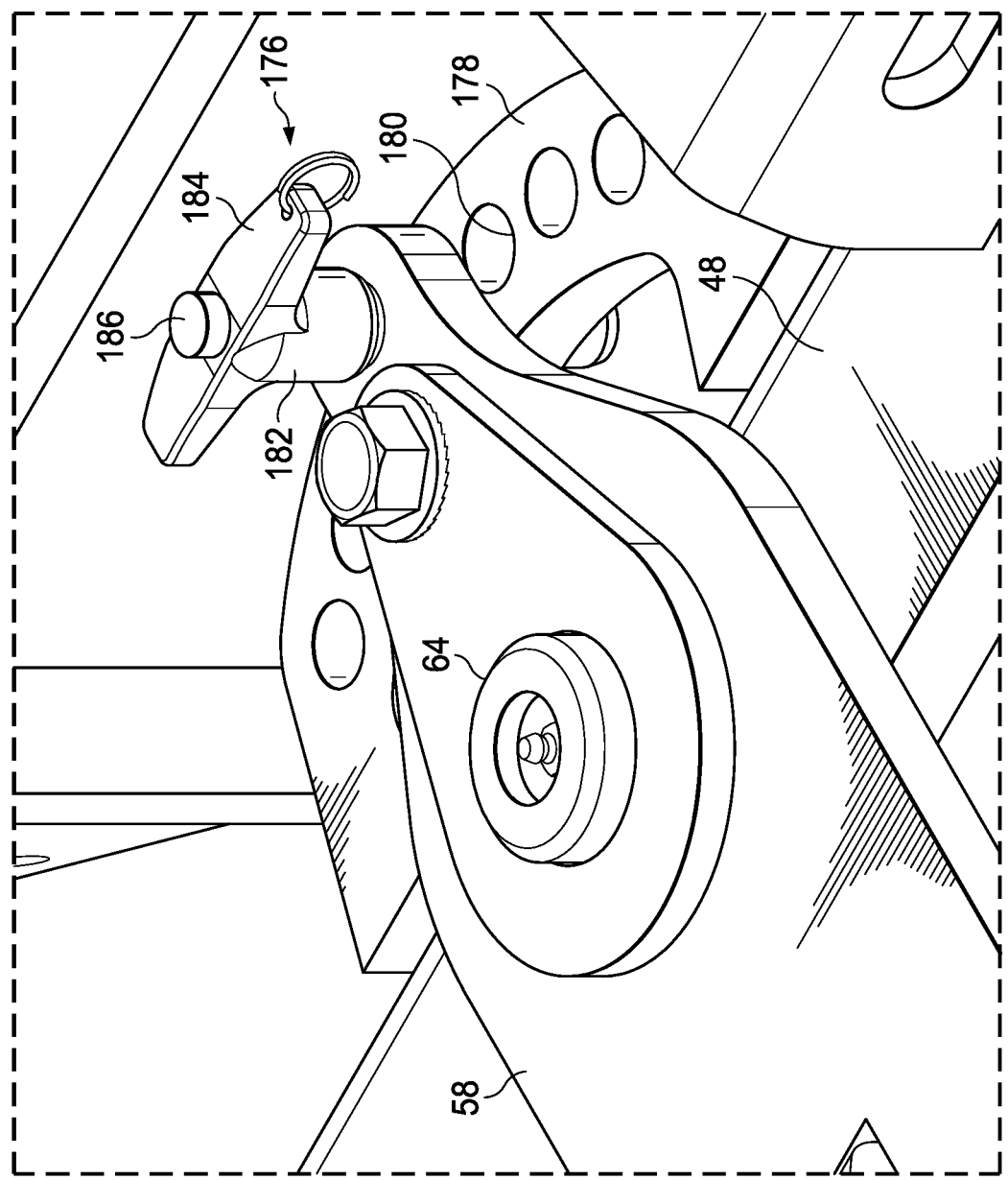
FIG. 10 is an enlarged perspective view of detail A in FIG. 8.

FIG. 10 shows an embodiment of the locking assembly 176 in more detail. As shown therein, the locking assembly 176 may include a locking pin 182 and a selector plate 178 including a plurality of openings 180. Alternatively, the selector plate 178 may include a plurality of grooves, ridges, or other suitable structure for selectively engaging a locking pin 182. For example, the selector plate 178 may comprise a semi-circular arc with the plurality of openings 180 or other suitable structure spaced apart thereon. The selector plate 178 may be affixed to any suitable part of the cross bar 48 or frame 42. For example, as shown in the embodiment of FIGS. 8-11, the selector plate 178 may depend from or be part of the cross bar 48. The locking pin 182 may be configured so that it may extend through top plate 58 of the swing arm 40 and engage one or more of the plurality of openings 180 of the selector plate 178. When the locking pin 182 is disposed through the top plate 58 and engaged with one or more of the plurality of openings 180, the swing arm 40 and cross bar 48 may be secured so as to prevent pivoting of the swing arm 40 with respect to the frame 42. The locking pin 182 may, for example, be a quick release ball lock pin or another suitable pin may be used. A quick release ball lock pin may include a handle 184 and a button or knob 186 used to release a catch (not shown) so as to allow the locking pin 182 to be readily disengaged from one or more of the plurality of openings 180. When the locking pin 182 is disengaged, a user may rotate the swing arm 40 with respect to the cross bar 48 and reengage the locking pin 182 so as to achieve a selected offset position. Persons of ordinary skill in the art will appreciate that any suitable structure for selectively fixing the cross bar 48 and the swing arm 40 together so as to inhibit rotation of the swing arm 40 may be employed. For example, any suitable detent may be configured so that an operator may manually disengage the detent so as to allow rotation of the swing arm 40 with respect to the cross bar 48. The detent may then be reengaged to secure a hitch 14, 140, 160 in a selected offset position.

Figure 11:
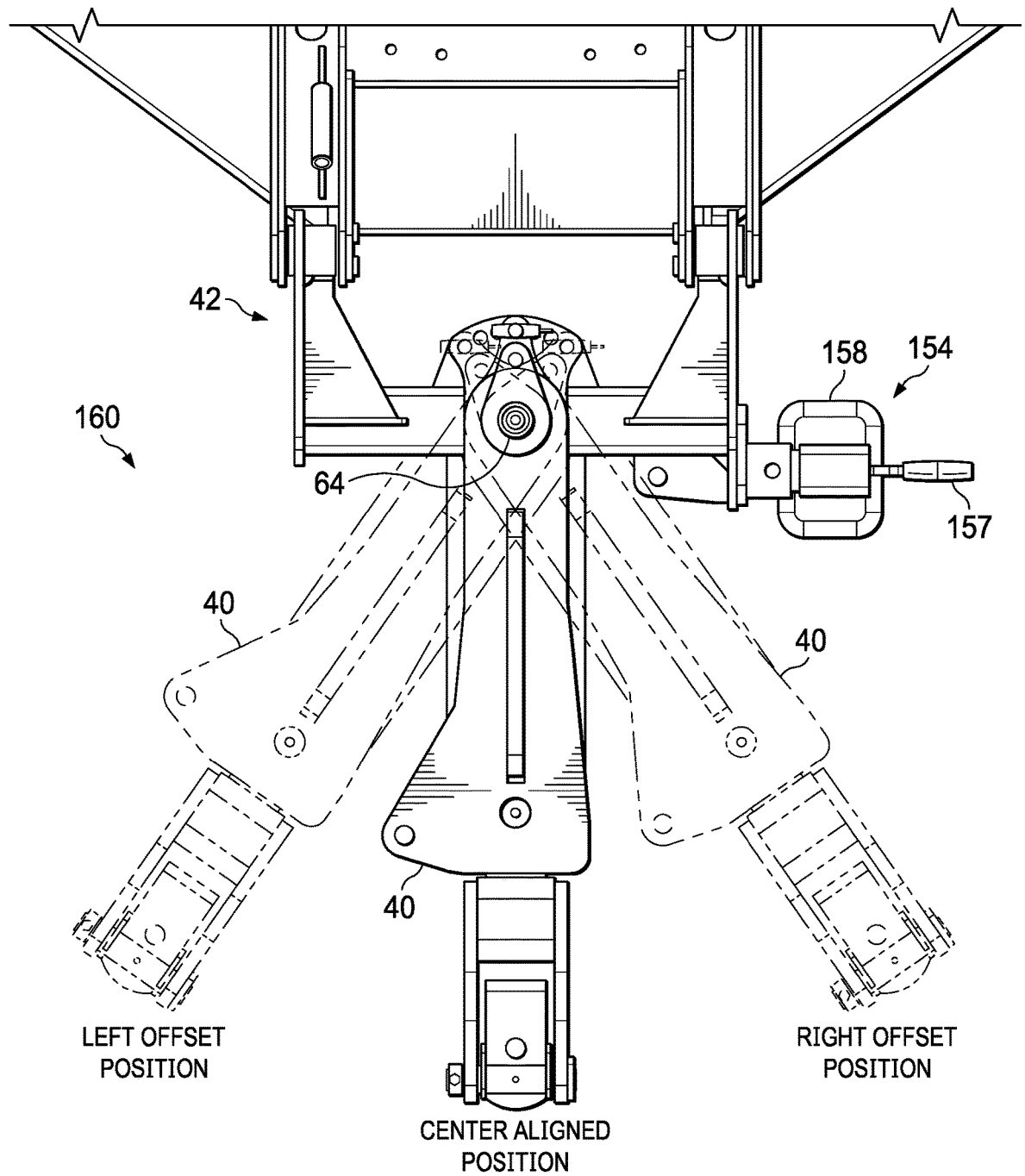
FIG. 11 is a top plan view of the variable offset hitch and a front end portion of a cutting unit shown in FIG. 8 showing the swing arm in each of a center aligned position, a left side offset position and a right side offset position.

In some embodiments, as shown in each of FIG. 8 and FIG. 11, when manually adjusting the position of the swing arm 40, a user may support the weight of the trailer implement on a jack 154. For example, hitch 160 may include the extendable jack 154 which may comprise an extension arm 156 including a base 158. A crank 157 may be used to extend the extension arm 156 when pressing base 158 against a supporting surface. For example, with the weight of the trailer supported, a user may disengage the locking assembly 176 so that swing arm 40 may be freely rotated about the pivot hinge 64 and the hitch 160 may be manually shifted to an offset left or offset right position. Once positioned, the locking assembly 176 may be reengaged. For example, as shown in FIG. 11, the swing arm 40 may be moved from a center aligned position to either of a left offset position (labeled and shown in dot-dash) or a right offset position (labeled and shown in dot-dash). Advantageously, in this embodiment, an offset position may be maintained without using a source of power from a tractor or other towing vehicle. Accordingly, power resources may be allocated for some other purpose.

In some embodiments, a work machine may include one or more controls for automatically transitioning the machine to an offset condition or a centered condition. For example, the work machine may include a tractor and a trailer coupled using one or more of the hitches 14, 140, 160. One or more of the steering cylinders or actuators 54, 56, 142, and 162 may be operatively connected to the tractor's existing hydraulics system, for example. An operator may activate one or more cab accessible levers to open a valve and direct hydraulic reservoir fluid to a hydraulic connection for providing hydraulic power to one or more of the steering cylinders or actuators 54, 56, 142, and 162. For example, as shown in FIG. 5, one or more hydraulic power lines 80 may be routed from towing vehicle 12 for distribution to the one or more of the steering cylinders or actuators 54, 56, 142, and 162. Alternatively, a source of pneumatic or electric power may be provided from the tractor or the trailer.

In some embodiments, a work machine may include one or more electronic controls configured for controlling one or more of the steering cylinders or actuators 54, 56, 142, and 162. The electronic controls may, for example, be accessible from an in cab display of the towing vehicle 12 and allow a user to automatically control power (e.g., electric, pneumatic, or hydraulic power) to the one or more steering cylinders or actuators 54, 56, 142, and 162. In some embodiments, an electronic control may also be positioned remotely outside of a cab.

Figure 12:
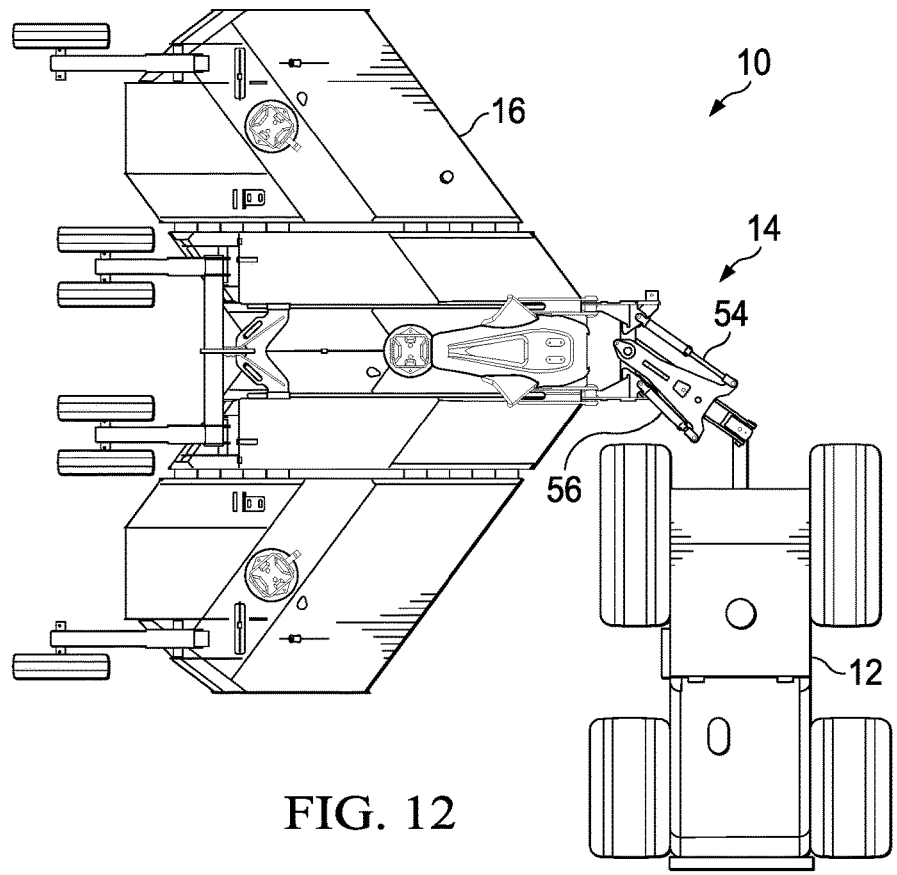
FIG. 12 is a top plan view of a mowing machine, variable offset hitch, and tractor shown when making a right-hand turn.

The variable offset hitches 14, 140, 160 described herein may provide a number of advantages over other hitches. For example, a mowing machine including a hitch 14, 140, 160 may be operated so as to adopt a sharp turn with a significantly reduced turning radius over other mowing machines without offset capability. For example, as shown in FIG. 12, mowing machine 10 may include hitch 14. The hitch 14 may be operated with left-side actuator 54 extended and right-side actuator 56 retracted when a user executes a sharp right turn, and vice versa for a left turn.

Figure 13A:
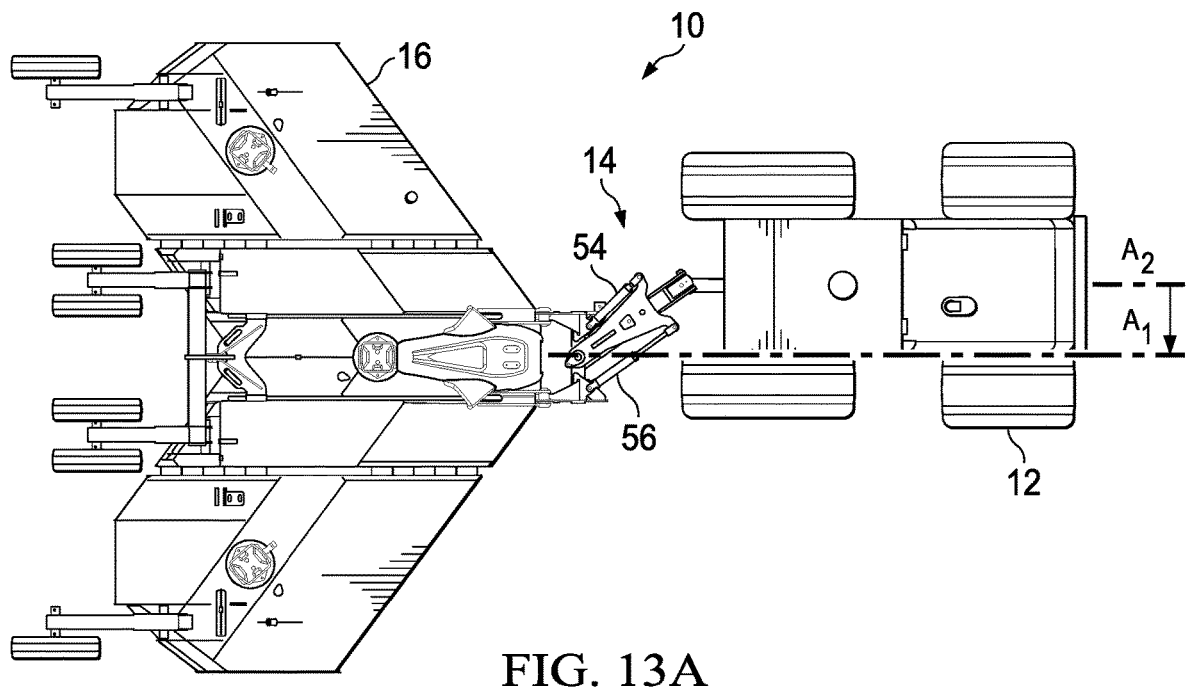
FIG. 13A is a top plan view of a mowing machine in a right offset position with respect to a tractor.
Figure 13B:
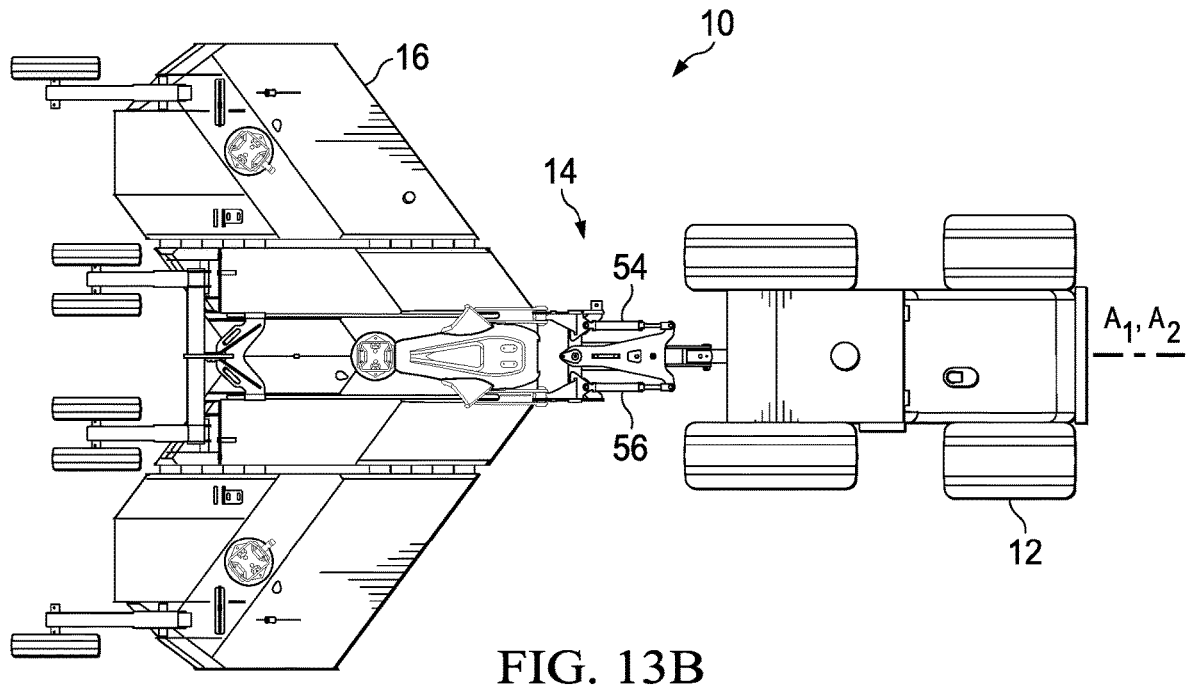
FIG. 13B is a top plan view of a mowing machine in a center aligned position with respect to a tractor.
Figure 13C:
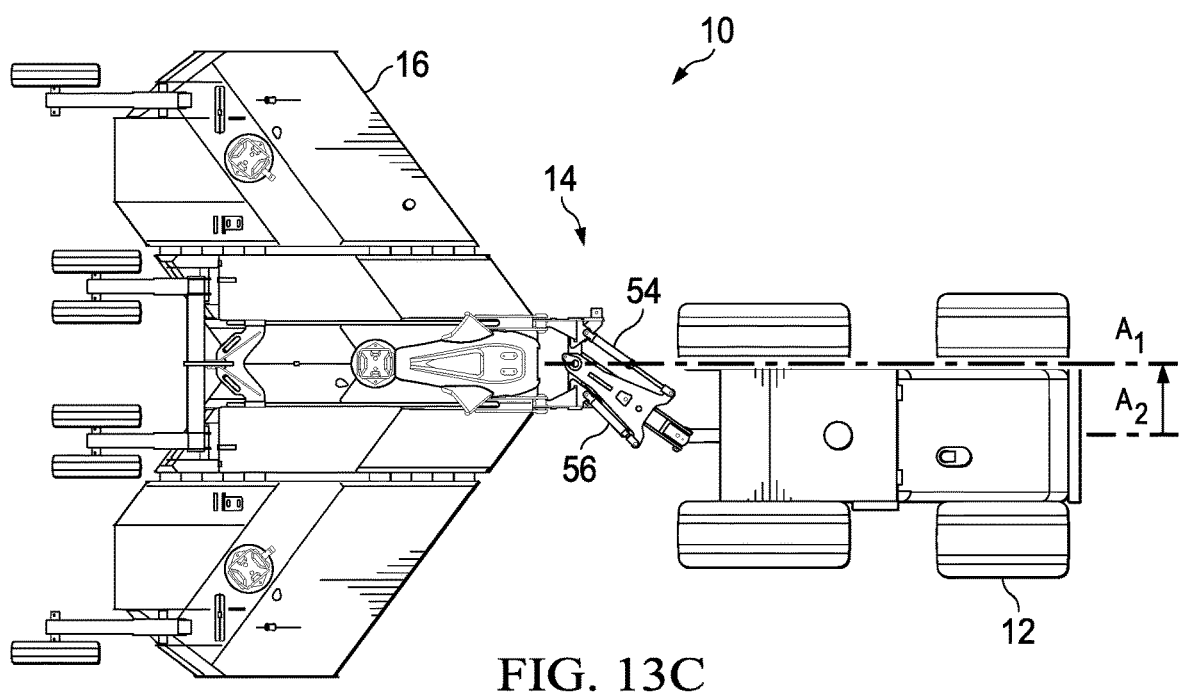
FIG. 13C is a top plan view of mowing machine in a left offset position with respect to a tractor.

Additionally, a mowing machine including a hitch 14, 140, 160 may be operated so as to provide added cutting reach to either of a left side or a right side of a towing vehicle. For example, as shown in FIGS. 13A-13C, a mowing machine 10 may be controlled (e.g., electronically, or manually) so that it adopts either of a left side or a right side offset condition or a centered condition. For example, as shown in FIG. 13A, a mowing machine 10 may adopt a right side offset condition wherein a longitudinal axis ($A_1$) of cutting unit 16 is offset right from a longitudinal axis ($A_2$) of towing vehicle 12 so as to provide added cutting reach to the right side of the towing vehicle 12. In the offset right condition of FIG. 13A, left-side actuator 54 may be in a retracted position and right-side actuator 56 may be in an extended position. Accordingly, added cutting reach may be provided to the right side of the towing vehicle 12. Alternatively, in embodiments using the hitch 140, the steering cylinder 142 may be actuated so that the piston rod 146 is extended and the rod 148 retracted so that the swing arm 40 pivots about the pivot hinge 64 to adopt an offset right condition. In embodiments using the hitch 160, the actuator 162 may be retracted so that the swing arm 40 pivots about the pivot hinge 64 to adopt an offset right condition. As shown in FIG. 13B, mowing machine 10 may adopt a centered condition. As shown in FIG. 13C, a mowing machine 10 may adopt a left side offset condition wherein a longitudinal axis ($A_1$) of cutting unit 16 is offset left from a longitudinal axis ($A_2$) of towing vehicle 12 so as to provide added cutting reach to the left side of the towing vehicle 12. For example, in some embodiments of an offset left condition as shown in FIG. 13C and using the hitch 14, left-side actuator 54 may be in an extended position and right-side actuator 56 may be in a retracted position. Alternatively, an offset left condition may be achieved using either of the hitches 140, 160 and with appropriate actuation of one or more steering cylinders or actuators 142 and 162.

As described in detail above, the present application is directed to a variable offset hitch that may be included as part of a work machine, such as a mowing machine that is useful for the mowing of grass and brush, and the trimming of shrubs and hedges (all such activity is generally referred to herein as mowing). Work machines as included herein may include a variable offset hitch together with either or both of a trailer implement and a towing vehicle. For exemplary purposes, an embodiment of a mowing machine including a variable offset hitch has been generally described as being removably coupled to a power-takeoff device of a tractor. Persons of ordinary skill in the art will understand that a mowing machine as described herein may be utilized with any suitable vehicle that contains a power-takeoff device, including but not limited to lawn tractors, UTVs, ATVs, trucks, or other suitable prime movers. Likewise, persons of ordinary skill in the art will understand that mowing machines as described herein may have any suitable cutting mechanisms, such as rotary cutters, flail cutters, or a combination thereof. Additionally, in some embodiments, the trailer may be some other type of implement other than a mower, such as a plow, spreader, hay rake, hay baler, or other trailer, for example.

Although the foregoing specific details describe certain embodiments of this invention, persons of ordinary skill in the art will recognize that various changes may be made in the details of this invention without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that this invention is not to be limited to the specific details shown and described herein.

What is claimed is:

1. A variable offset hitch configured for connecting a trailer implement to a towing vehicle, said hitch comprising:
 a swing arm comprising a first hinge component;
 said first hinge component configured for coupling with another hinge component on the towing vehicle to form a first hinge connection having a substantially vertical first axis;
 a frame connected to said swing arm at a second hinge connection having a substantially vertical second axis spaced apart from said first axis;
 said frame being configured for attachment to the trailer implement; and
 at least one actuator connected to said swing arm and said frame;
 wherein said at least one actuator is extendable and retractable to cause said swing arm to pivot with respect to said frame about said second axis;

wherein said swing arm comprises a central support frame and an extension arm extending from said central support frame;
wherein said extension arm comprises said first hinge component;
wherein said extension arm is connected to said central support frame so as to permit rotation of said extension arm about a substantially horizontal roll axis.

2. The variable offset hitch of claim 1,
wherein said first hinge component is mounted so as to permit rotation of said first hinge component about a substantially horizontal pitch axis.

3. A variable offset hitch configured for connecting a trailer implement to a towing vehicle, said hitch comprising:
a swing arm comprising a first hinge component;
said first hinge component configured for coupling with another hinge component on the towing vehicle to form a first hinge connection having a substantially vertical first axis;
a frame connected to said swing arm at a second hinge connection having a substantially vertical second axis spaced apart from said first axis;
said frame being configured for attachment to the trailer implement; and
at least one actuator connected to said swing arm and said frame;
wherein said at least one actuator is extendable and retractable to cause said swing arm to pivot with respect to said frame about said second axis;
wherein said swing arm comprises a central support frame and an extension arm extending from said central support frame;
wherein said extension arm comprises said first hinge component;
wherein said first hinge component is mounted so as to permit rotation of said first hinge component about a substantially horizontal pitch axis.

4. A variable offset hitch configured for connecting a trailer implement to a towing vehicle, said hitch comprising:
a swing arm comprising a first hinge component;
said first hinge component configured for coupling with another hinge component on the towing vehicle to form a first hinge connection having a substantially vertical first axis;
a frame connected to said swing arm at a second hinge connection having a substantially vertical second axis spaced apart from said first axis;
said frame being configured for attachment to the trailer implement; and
at least one actuator connected to said swing arm and said frame;
wherein said hitch does not include any supporting wheels;
wherein said at least one actuator is extendable and retractable to cause said swing arm to pivot with respect to said frame about said second axis;
wherein said at least one actuator comprises a steering cylinder disposed transverse to said swing arm.

5. The variable offset hitch of claim 4, wherein said steering cylinder traverses through an opening of said swing arm.

6. A variable offset hitch configured for connecting a trailer implement to a towing vehicle, said hitch comprising:
a swing arm comprising a first hinge component;
said first hinge component configured for coupling with another hinge component on the towing vehicle to form a first hinge connection having a substantially vertical first axis;
a frame connected to said swing arm at a second hinge connection having a substantially vertical second axis spaced apart from said first axis;
said frame being configured for attachment to the trailer implement; and
at least one actuator connected to said swing arm and said frame;
wherein said hitch does not include any supporting wheels;
wherein said at least one actuator is extendable and retractable to cause said swing arm to pivot with respect to said frame about said second axis;
wherein said at least one actuator comprises an actuator having a first end pivotally attached to said frame and a second end pivotally attached to said swing aim;
wherein said first and second ends of said actuator are disposed on opposite sides of a central longitudinal axis of said swing arm.

7. A variable offset hitch configured for connecting a trailer implement to a towing vehicle, said hitch comprising:
a swing arm comprising a first hinge component;
said first hinge component configured for coupling with another hinge component on the towing vehicle to form a first hinge connection having a substantially vertical first axis;
a frame connected to said swing arm at a second hinge connection having a substantially vertical second axis spaced apart from said first axis;
said frame being configured for attachment to the trailer implement;
at least one actuator connected to said swing arm and said frame;
wherein said hitch does not include any supporting wheels;
wherein said at least one actuator is extendable and retractable to cause said swing arm to pivot with respect to said frame about said second axis; and
a locking assembly;
wherein said locking assembly is configured to lock said hitch in a secured position; and
wherein said locking assembly is configured for manual release so as to enable a user to manually rotate said swing arm about said second axis so as to pivot said swing arm with respect to said frame.

8. The variable offset hitch of claim 7 wherein said hitch is configured for both:
manual rotation of said swing arm about said second axis so as to pivot said swing arm with respect to said frame when said hitch is connected to the trailer implement but not connected to the towing vehicle; and
actuation of said at least one actuator so as to cause said swing arm to rotate about each of said first axis and said second axis so as to pivot said swing arm with respect to said frame and laterally offset a longitudinal axis of the trailer implement with respect to a longitudinal axis of the towing vehicle when said hitch is connected to the towing vehicle and the trailer implement.

9. The variable offset hitch of claim 8 wherein said at least one actuator comprises a hydraulic actuator, the hitch further comprising:
one or more hoses configured for routing hydraulic fluid to said hydraulic actuator; and a control valve configured so that an operator may selectively engage or disengage said hydraulic actuator from a hydraulic power system of the towing vehicle.

10. The variable offset hitch of claim 7, said locking assembly comprising:
   a locking pin; and
   a selector plate including a plurality of openings or grooves configured for engaging said locking pin so as to secure said hitch in said secured position.

11. A variable offset hitch configured for connecting a trailer implement to a towing vehicle, said hitch comprising:
   a swing arm comprising a first hinge component;
   said first hinge component configured for coupling with another hinge component on the towing vehicle to form a first hinge connection having a substantially vertical first axis;
   a frame connected to said swing arm at a second hinge connection having a substantially vertical second axis spaced apart from said first axis;
   said frame being configured for attachment to the trailer implement; and
   at least one actuator connected to said swing arm and said frame;
   wherein said hitch does not include any supporting wheels;
   wherein said at least one actuator is extendable and retractable to cause said swing arm to pivot with respect to said frame about said second axis;
   wherein a length of said swing arm comprises substantially an entire length of said hitch.

12. A variable offset hitch configured for connecting a trailer implement to a towing vehicle, said hitch comprising:
   a swing arm comprising a first hinge component;
   said first hinge component configured for coupling with another hinge component on the towing vehicle to form a first hinge connection having a substantially vertical first axis;
   a frame connected to said swing arm at a second hinge connection having a substantially vertical second axis spaced apart from said first axis;
   said frame being configured for attachment to the trailer implement; and
   at least one actuator connected to said swing arm and said frame;
   wherein said hitch does not include any supporting wheels;
   wherein said at least one actuator is extendable and retractable to cause said swing arm to pivot with respect to said frame about said second axis;
   wherein said frame comprises a cross bar and a pair of connector arms affixed to said cross bar;
   wherein said cross bar is disposed transverse to said swing arm and said second hinge connection is disposed on said cross bar;
   wherein said pair of connector arms is configured for secured attachment to said trailer implement.

13. A variable offset hitch configured for connecting a trailer implement to a towing vehicle, said hitch comprising:
   a swing arm comprising a first hinge component;
   said first hinge component configured for coupling with another hinge component on the towing vehicle to form a first hinge connection having a substantially vertical first axis;
   a frame connected to said swing arm at a second hinge connection having a substantially vertical second axis spaced apart from said first axis by a distance;
   said distance being substantially an entire length of said hitch;
   wherein said hitch does not include any hinge having a substantially vertical axis between said first axis and said second axis;
   said frame being configured for attachment to the trailer implement; and
   a locking assembly configured for releasably securing said swing arm in a plurality of positions with respect to said frame.

14. The variable offset hitch of claim 13 further comprising an actuator connected to said frame and said swing arm;
   said actuator being operable for moving said swing arm among said plurality of positions with said locking assembly in a released condition.

* * * * *

UNITED STATES PATENT AND TRADEMARK OFFICE
CERTIFICATE OF CORRECTION

| | |
|---|---|
| PATENT NO. | : 12,102,039 B1 |
| APPLICATION NO. | : 17/107418 |
| DATED | : October 1, 2024 |
| INVENTOR(S) | : Justin Anthony Hay |

It is certified that error appears in the above-identified patent and that said Letters Patent is hereby corrected as shown below:

In the Specification

In Column 11, Line 27, delete "base end 171" and insert --base end 169-- therefor.

Signed and Sealed this
Twelfth Day of November, 2024

Katherine Kelly Vidal
*Director of the United States Patent and Trademark Office*